United States Patent Office 2,794,000
Patented May 28, 1957

2,794,000

EMULSIFIABLE OIL COMPOSITION

Paul Moritz Ruedrich, Berkeley, Calif., assignor, by mesne assignments, to Nopco Chemical Company, Harrison, N. J., a corporation of New Jersey No Drawing. Application November 15, 1954,
Serial No. 468,993

12 Claims. (Cl. 252—51.5)

This invention relates to new compositions of matter useful as emulsifiers and especially adapted for the preparation of emulsifiable oils such as the so-called "soluble oils," cutting oils and spray oils. More particularly, the invention relates to condensation products formed by reacting certain alkanolamines with a mixture of ethylenediamine tetraacetic acid and one or more fatty acids.

It is generally known that alkanolamines may be caused to react with fatty acids at temperatures in the range of 300° F. to 375° F. to form condensation products with the splitting-off of water. Such condensation products (not to be confused with the addition products or "salts" formed at room temperatures between the basic amines and fatty acids) have found use as water-soluble, or water-dispersible, wetting agents. These condensation products appear to be composed primarily of amides formed by reaction of the fatty acids at the nitrogen atom of the alkanolamines.

In accordance with the present invention I have found that, when a fatty acid is mixed with about 4 to 8 mol percent (based on total acid content of the mixture) of ethylenediamine tetraacetic acid and the mixture reacted at a temperature of about 325° F. with an excess of a dialkanol amine until between 90% and 96% of the acid mixture has been reacted, a product results which has solubility and emulsifying properties not found in the conventional alkanolamine fatty acid condensation products. Firstly, my products are completely soluble in paraffinic hydrocarbons and in hydrocarbon mixtures containing preponderant amounts of the paraffins such as, for example, petroleum distillates. Secondly, when dissolved in hydrocarbon oils in small amounts, my products cause such oils to readily emulsify when added to water. Thirdly, my products have strong rust-inhibiting properties either when dissolved in hydrocarbon oils or when present in hydrocarbon oil and water emulsions.

The action of the ethylenediamine tetraacetic acid, which is sometimes called "(ethylenedinitrilo) tetraacetic acid" and has a composition represented by the formula (HOOC—CH₂)₂N—CH₂—CH₂—N(CH₂COOH)₂, is not well understood. It is believed that it acts as a bridging compound between at least some of the fatty acid and the alkanolamine. In any event, it enters into the reaction and is no longer present as such in the resulting product. For brevity, ethylenediamine tetraacetic acid may be referred to hereinafter as EDTA.

Although any fatty acid, either saturated or unsaturated, containing eight or more carbon atoms may be used to prepare products in accordance with the invention, the properties of the product will vary somewhat according to the acid chosen. For example, the unsaturated acids tend to give products of lower melting points than those made from the corresponding saturated acids. Thus, a product made by condensing a mixture of oleic acid and EDTA with diethanolamine is liquid at room temperature, whereas the corresponding products made with stearic or lauric acids are solid. Likewise, the emulsifying properties vary slightly with the acid chosen, the lower molecular weight saturated acids tending to yield the most active emulsifiers.

In the preparation of emulsifiable oils it is a great advantage for the oil-soluble emulsifier to be a liquid at ambient temperatures, since a liquid material may be more conveniently handled by the various types of blending equipment and a homogenous blend with the oil is readily obtained without heating. Storage and other handling problems are also facilitated when the emulsifier is a liquid. In the manufacture of my emulsifiers I have found that optimum emulsifying properties in a liquid product can be attained by the use of a mixture of lauric and oleic acids instead of a single fatty acid. For this purpose I prefer to use a mixture containing a molal ratio of lauric acid to oleic acid of about 1:1, although a ratio between 3:1 and 1:3 is suitable.

For proper results, the amount of EDTA is important. I prefer to use an amount equal to between 4.5 and 5.5 mol percent of the total acid present in the acid mixture (i. e., fatty acid plus EDTA), although between 4% and 8% may be used. The EDTA may conveniently be mixed with the fatty acid before the addition of the alkanolamine.

Any of the common dialkanolamines, such as for example, diethanolamine, dipropanolamine and ethanol butanolamine, may be used for the purposes of the invention. Mainly for the reason of availability, diethanolamine is preferred. The alkanolamine should be present in a stoichiometric excess and, preferably, in an amount such that the ratio of the NH radicals of the amine to the COOH radicals of the total acid present is between 1.1 to 1 and 1.3 to 1.

In practicing the invention, the mixture of fatty acid, EDTA and dialkanolamine is heated to a temperature between about 300° F. and 375° F. in a reaction vessel equipped with means for permitting escape of water formed in the reaction. In most cases a temperature of 325° F. will be found suitable to cause the reaction to proceed to the desired point in a reasonable time (one to six hours) while permitting sufficient control to avoid the reaction continuing past the desired point.

As stated prior, the reaction is continued until from 90% to 96% of the acid value present is reacted. This point in the reaction is important. If the reaction is carried beyond 96% acid consumption, the product functions poorly as an emulsifier for oil-in-water emulsions. If the reaction is stopped before 90% acid consumption, the product is not satisfactorily oil-soluble. This point in the reaction may be readily determined by removing samples from time to time of the reaction mixture and titrating in an alcoholic medium with standard alkali solution to a phenolphthalein end point. Such titration will be a measure of the amount of the total acid still unconsumed in the reaction. When the desired point is reached, the entire mixture is immediately cooled to below 300° F. and preferably to room temperature.

Example 1

30.4% by weight of lauric acid, 25.4% by weight of oleic acid, 3.5% by weight of EDTA, and 40.7% by weight of diethanolamine were introduced into a vented esterification kettle. The mixture was heated to 325° F. causing the mixture to react with the escape of water from the kettle vent. Samples of the reacting mixture taken at intervals and titrated showed a gradual decrease in acid value. When the titration showed an acid value equivalent to 12 mg. KOH per gram of mixture, indicating a consumption of 93% of the acid content, the reaction was stopped by cooling the mixture to room temperature. The resulting product had the folowing properties:

Color _____ Brown.
Form _____ Viscous liquid.
Density _____ 8.4 lb./gallon @ 85° F.
Odor _____ Pungent (characteristic).
Solubility in mineral oil ___ Complete.
Solubility in water _____ Produces gel.

In order to illustrate the preparation of a cutting oil made with my emulsifiers the following example is offered:

*Example II*

To 95 parts by weight of a solvent refined Coalinga crude oil fraction, having a Saybolt Universal viscosity of about 100 at 100° F., there was added 5 parts by weight of the product described in Example I. A clear solution was formed, a sample of which remained stable without precipitation for several months. Ten parts by weight of this oil were added to 90 parts of water, producing an oil-in-water emulsion which remained stable for 24 hours and which was entirely satisfactory as a cutting oil emulsion for machining operations.

To illustrate the anti-rust properties of my emulsifiers the following example is presented:

*Example III*

A steel plate was immersed in the cutting oil-water emulsion prepared in Example II. After 24 hours of immersion, no rust appeared on the steel plate. A similar test made with a commercial cutting oil-water emulsion showed a heavy rust at the end of 24 hours.

Although in Example II the amount of emulsifier used was 5% by weight of the mixture, the amount may be varied as desired to give any degree of emulsion required for a given application. Likewise, though a 100 S. U. @ 100° F. oil was shown in the illustrative example, any petroleum fraction may be used according to the desired application.

Although the product may be marketed per se, it may be convenient in some instances to blend hydrocarbon oil with the product to form a concentrate of the product in the oil. Such concentrates have utility, for example, where a commercial material of lower viscosity is desired. Such concentrates can then be blended into other oil in desired amounts for producing emulsifiable oils. Such concentrates are within the broad scope of the present invention.

I claim:

1. The process for the manufacture of an emulsifier which comprises: reacting at a temperature between about 300° F. and about 375° F. a mixture of fatty acid having at least eight carbon atoms per molecule, ethylenediamine tetraacetic acid and a stoichiometric excess of a dialkanolamine until between 90% and 96% of the total acid value is consumed in a water-splitting reaction and removing from the product the water so split off, the ethylenediamine tetraacetic acid being present in said mixture in an amount between about 4 and 8 mol percent of the total acid.

2. The process of claim 1 wherein the ethylenediamine tetraacetic acid is present in the mixture in an amount between 4.5 and 5.5 mol percent of the total acid.

3. The process of claim 1 wherein the ratio of the NH radicals of the dialkanolamine to the COOH radicals of the total acid present is between 1.1 to 1 and 1.3 to 1.

4. The process of claim 1 in which the alkanolamine is selected from the group consisting of diethanolamine, dipropanolamine and ethyl butanolamine.

5. The process of claim 4 in which the alkanolamine is diethanolamine.

6. The process of claim 4 in which the alkanolamine is dipropanolamine.

7. The process of claim 4 in which the alkanolamine is ethyl butanolamine.

8. The process of claim 1 in which the fatty acid is a mixture of two or more fatty acids.

9. The process of claim 8 in which the fatty acid is a mixture of oleic acid and lauric acid in a molal ratio between 3:1 and 1:3.

10. A mineral-oil-soluble product useful as an emulsifier consisting essentially of the product made by the process of claim 1.

11. An emulsifiable oil comprising a petroleum oil fraction containing the product made by the process of claim 1 in sufficient quantity to cause the oil to emulsify with water.

12. An oil concentrate useful in the preparation of emulsifiable oils consisting esentially of a solution in a petroleum oil fraction of the product made by the process of claim 1.

References Cited in the file of this patent

UNITED STATES PATENTS

| | | |
|---|---|---|
| 2,524,219 | Bersworth | Oct. 3, 1950 |
| 2,540,678 | Kelley | Feb. 6, 1951 |
| 2,638,449 | White | May 12, 1953 |
| 2,680,094 | Bartlett | June 1, 1954 |